US011114884B2

(12) United States Patent
Zhao et al.

(10) Patent No.: US 11,114,884 B2
(45) Date of Patent: Sep. 7, 2021

(54) SENSING COIL SYSTEM

(71) Applicant: Intel Corporation, Santa Clara, CA (US)

(72) Inventors: Yujuan Zhao, Belmont, CA (US); Anand Konanur, Sunnyvale, CA (US); Steven Gaskill, Corvallis, OR (US); Zhen Yao, San Jose, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 16/332,904

(22) PCT Filed: Sep. 30, 2016

(86) PCT No.: PCT/US2016/054808
§ 371 (c)(1),
(2) Date: Mar. 13, 2019

(87) PCT Pub. No.: WO2018/063334
PCT Pub. Date: Apr. 5, 2018

(65) Prior Publication Data
US 2019/0260219 A1 Aug. 22, 2019

(51) Int. Cl.
*H02J 7/02* (2016.01)
*H02J 50/12* (2016.01)
*H01F 38/14* (2006.01)
*H04B 5/00* (2006.01)
*H02J 50/60* (2016.01)

(52) U.S. Cl.
CPC .............. *H02J 7/025* (2013.01); *H01F 38/14* (2013.01); *H02J 50/12* (2016.02); *H02J 50/60* (2016.02); *H04B 5/0037* (2013.01); *H01F 2038/143* (2013.01)

(58) Field of Classification Search
USPC ......................................................... 320/108
See application file for complete search history.

(56) References Cited

U.S. PATENT DOCUMENTS

| | | | |
|---|---|---|---|
| 2011/0004278 | A1 | 1/2011 | Aghassian et al. |
| 2011/0221385 | A1 | 9/2011 | Partovi et al. |
| 2013/0200721 | A1 | 8/2013 | Kurs et al. |
| 2014/0001874 | A1 | 1/2014 | Nahidipour |
| 2014/0138199 | A1 | 5/2014 | Ichikawa et al. |
| 2014/0232334 | A1 | 8/2014 | Konanur et al. |

(Continued)

OTHER PUBLICATIONS

PCT International Search Report issued for PCT/US2016/54808, 2 pgs., dated Dec. 20, 2016.

*Primary Examiner* — Mohammed Alam
(74) *Attorney, Agent, or Firm* — Schiff Hardin LLP

(57) ABSTRACT

A sensor system can include a sensor coil and a sensor coupled to the sensor coil. The sensor coil can include coil portions that generate signals based on magnetic coupling induced in the coil portions by a receiving coil device (e.g., a NFC tag) and magnetic distortion induced in the coil portions by magnetic coupling of a power transmitting unit (PTU). The sensor can reduce the magnetic distortion induced in the first and the second coil portions by the PTU, detect the receiving coil device based the first and the second signals, and control the PTU based on the detected receiving coil device.

24 Claims, 8 Drawing Sheets

Sensor System 200

(56) References Cited

U.S. PATENT DOCUMENTS

| | | | |
|---|---|---|---|
| 2015/0364929 A1* | 12/2015 | Davis | H01F 38/14 |
| | | | 307/104 |
| 2016/0231364 A1* | 8/2016 | Nejatali | H02J 7/025 |
| 2016/0282500 A1* | 9/2016 | Filippenko | G01V 3/104 |
| 2018/0097401 A1* | 4/2018 | Gaskill | H02J 7/0042 |
| 2019/0260219 A1* | 8/2019 | Zhao | H04B 5/0037 |

* cited by examiner

SENSING COIL SYSTEM

BACKGROUND

Field

Aspects described herein generally relate to sensing coil systems, including sensing coils (e.g., Near-field communication sensing coils) operable in wireless charging systems

Related Art

Wireless charging or inductive charging uses a magnetic field to transfer energy between two devices. Wireless charging of a device can be implemented using charging station. Energy is sent from one device to another device through an inductive coupling.

The inductive coupling is used to charge batteries or run the receiving device. In operation, power is delivered through non-radiative, near field, magnetic resonance from a Power Transmitting Unit (PTU) to a Power Receiving Unit (PRU).

PTUs use an induction coil to generate a magnetic field from within a charging base station, and a second induction coil in the PRU (e.g., in a portable device) takes power from the magnetic field and converts the power back into electrical current to charge the battery and/or power the device. In this manner, the two proximal induction coils form an electrical transformer. Greater distances between Transmitter and receiver coils can be achieved when the inductive charging system uses magnetic resonance coupling. Magnetic resonance coupling is the near field wireless transmission of electrical energy between two coils that are tuned to resonate at the same frequency.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, near field communication (NFC) is a wireless communication protocol generally implemented for establishing wireless communication between devices in close proximity Generally, NFC requires that NFC devices be present within a relatively small distance from one another so that their corresponding magnetic fields can exchange information. Typically, a first NFC device transmits or generates a magnetic field modulated with the information. This magnetic field inductively couples the information onto a second NFC device that is proximate to the first NFC device. The second NFC device can respond to the first NFC device by inductively coupling its corresponding information onto the first NFC device.

Because both NFC devices and wireless charging devices operate within a limited range (e.g., within the near field of the antenna pattern) and within similar devices, it is common for NFC devices (e.g., an NFC tag) to be brought within the near field of an active PTU causing the power transmitting coil of the PTU to magnetically couple with the NFC device. This may cause the NFC device to overheat or be damaged by the coupled power of the PTU.

Figure 1A:
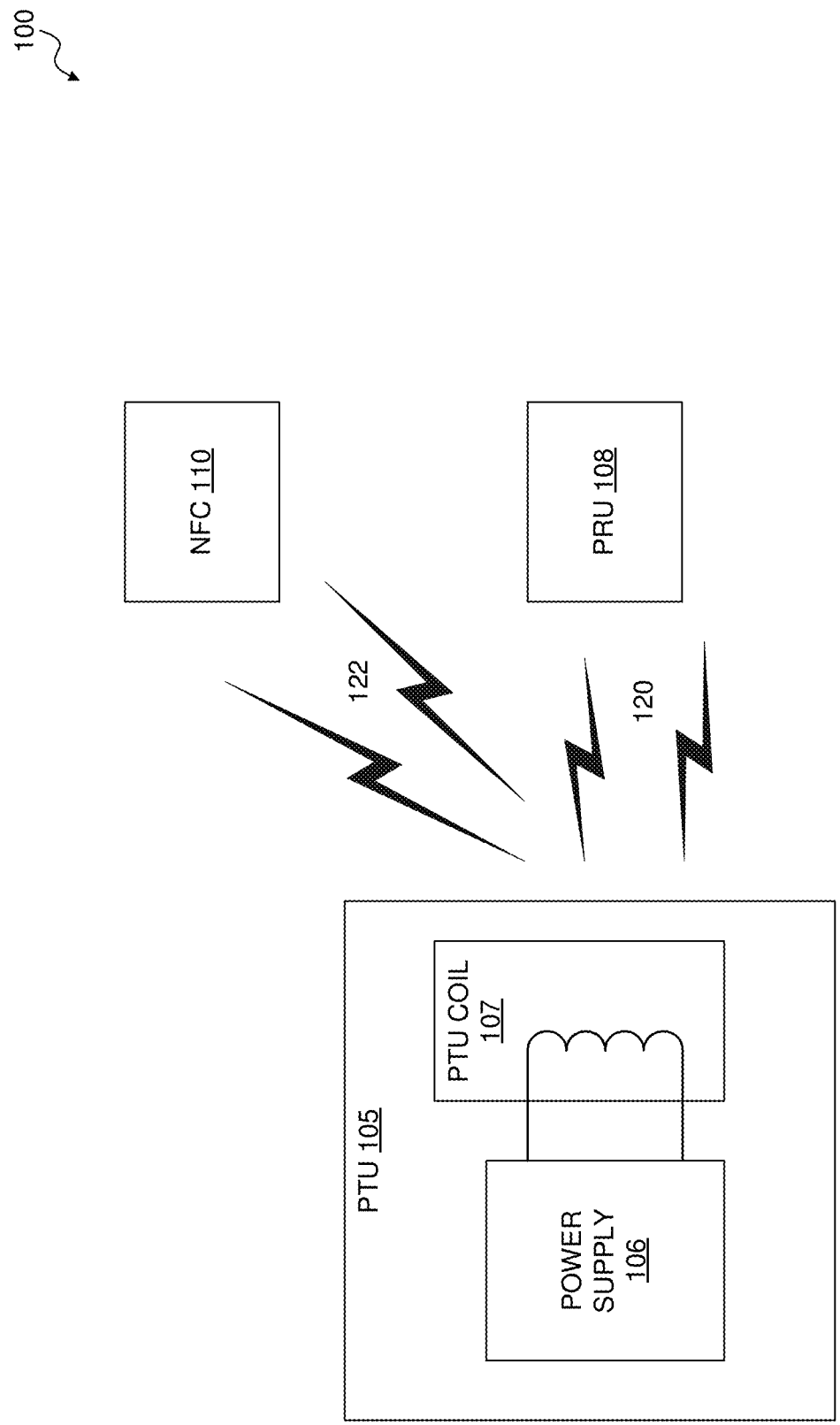
FIG. 1 illustrates a wireless charging system according to an exemplary aspect of the present disclosure.

FIG. 1 illustrates a wireless charging system 100 with a power transmit unit (PTU) 105 actively charging a power receiving unit (PRU) 108, where a Near Field Communications (NFC) device 110 is in close proximity to the PTU 105 (and the PRU 108). In an exemplary aspect, the NFC device 110 is a NFC tag, but is not limited thereto.

In an exemplary aspect, the PTU 105 is configured to perform one or more wireless charging operations conforming to one or more wireless power protocols/standards such as one or more AirFuel Alliance (AA) standards, Alliance for Wireless Power (A4WP) standards, Powers Matters Alliance (PMA) standards, Wireless Power Consortium standards (e.g., Qi), or other wireless power standards/protocols as would be understood by one of ordinary skill in the relevant arts. In operation, the PTU 105 can be configured to deliver power (e.g., through non-radiative, near field, magnetic resonance) to the PRU 108.

In an exemplary aspect, the PTU 105 can be configured to operate with a magnetic resonant charging operating at, for example, 6.78 MHz with charging distances of up to, for example, one meter. For status and control signaling, the PTU 105 can be configured to adopt an out-of-band Bluetooth Low Energy (BLE) link operating at, for example, 2.4 GHz. Initial charging and setup for the devices as well as status updates are handled over the BLE connection. This allows the PTU to adjust how much power is being delivered and to enter into a power saving mode when charging is complete.

In an exemplary aspect, the PTU 105 includes a power supply 106 that is configured to drive a PTU coil 107 to generate a magnetic field 120, 122. The PRU 108 similarly includes a PRU coil (not shown) that, when within the magnetic field 120 generated by the PTU 105, is configured to convert the magnetic field 120 back into electrical current to charge a battery of the PRU 108 and/or power the PRU 108. In operation, because the NFC device 110 (e.g., NFC tag) is in proximity with the PTU 105, the PTU 105 magnetically couples (e.g., 122) with the NFC device 110. In this example, the NFC device 110 may be damaged or otherwise negatively impacted as a result of the magnetic coupling with the PTU 105.

That is, when the NFC device 110 is brought within the near field of the active PTU 105, the PTU coil 107 magnetically couples with the NFC coil of the NFC device 110. While the NFC coil of the NFC device 110 may not be tuned to the same frequency as the PTU coil 107, a significant amount of energy may still be delivered to the NFC device 110. In this example, the NFC device 110 may not be designed to withstand this amount of energy transfer and the NFC 110 device may overheat or be damaged.

In exemplary aspects of the present disclosure, the PTU 105 may be configured to determine the presence of the NFC device 110 (e.g., while actively charging) into the charge operating volume of the PTU 105.

In response, the PTU 105 may take one or more actions, such as pause or terminate wireless charging operations, and/or generate an alert (such as to alert a user). The PTU 105 may be configured to query for NFC devices such as the NFC device 110 that are within range to determine the presence of a proximate NFC device. For example, the PTU 105 can be configured to periodically stop charging operations and poll for proximate NFC devices using, for example, a built-in NFC reader. In an exemplary aspect, the PTU 105 includes a capacitive sensor configured to sense the proximity of a person to trigger an NFC query of nearby devices.

In one or more exemplary aspects, the NFC device 110 may operate in accordance with Near Field Communication for the ISO/IEC 18000-3 air interface standard (International Organization for Standardization/International Electrotechnical Commission, 18000-3:2010 published November, 2010) which operates at a center frequency at or near 13.56 MHz using amplitude shift keyed (ASK) modulation and can transmit at data rates between 100 and 400 kilobits/second.

NFC communications may involve an initiator and a target. The initiator transmits in the blind and awakens the target if the target is within proximity. If the target is passive with no internal power source, the target is charged by the near field energy from the initiator during the initial interrogation and uses that energy to perform a desired function. In this case, the initiator is referred to as an NFC reader and the target is referred to as an NFC tag. NFC tags appear in various forms, including, for example, smart banking cards, access cards, key fobs, etc.

Figure 2:
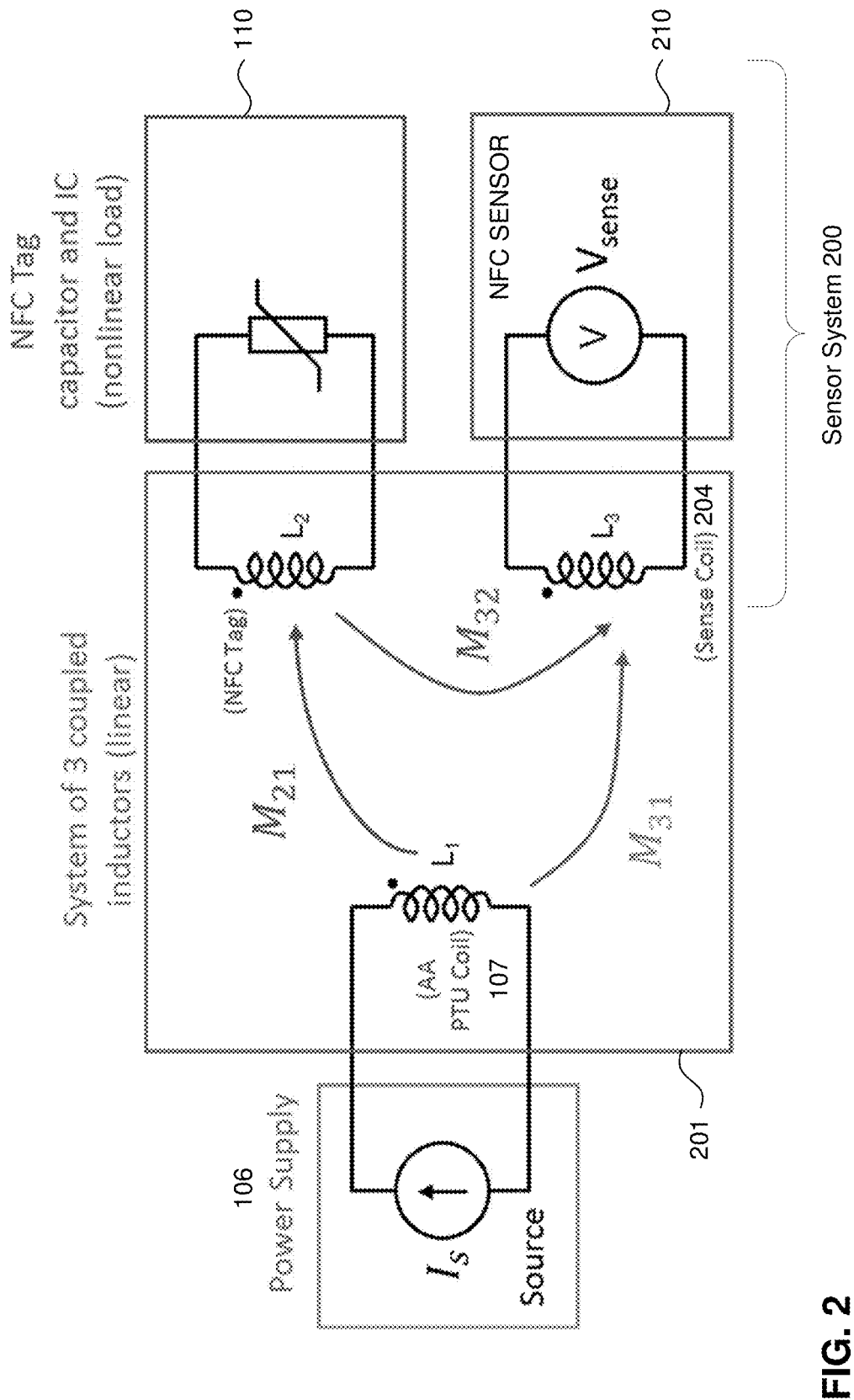
FIG. 2 illustrates a sensor system according to an exemplary aspect of the present disclosure.

FIG. 2 illustrates a sensor system 200 according to an exemplary aspect of the present disclosure. In an exemplary aspect, the sensor system 200 can be independent of or included within a PTU, such as PTU 105. In an exemplary aspect, the sensor system 200 is configured to sense or otherwise detect one or more NFC devices, such as NFC device 110.

As shown in FIG. 2, the power supply 106 and PTU coil 107 of the PTU 105 interacts with NFC device 110 and the sensor system 200 within an operating area 201 of the PTU 105. For example, the PTU 105 can magnetically couple to the NFC device 110 through the mutual inductance M21 and to the sensor system 200 by the mutual inductance M31. The NFC device 110 also may magnetically couple to the sensor system 200 by the mutual inductance M32. As described above, a significant amount of energy may be coupled to the NFC device 110 through the mutual inductance M21. In an exemplary aspect, the magnetic resonance may be at a frequency of, for example, 6.78 MHz and the NFC device 110 may operate at the frequency of, for example, 13.56 MHz, but are not limited to these exemplary frequencies.

In an exemplary aspect, the sensor system 200 can be configured to reduce/suppress harmonics to reduce the signal to noise ratio (SNR) of the NFC device 110 detection signal (mutual inductance M32). For example, the PTU 105 may have a significant contribution to the higher order harmonics which may appear as noise to the sensor system 200. In a non-limiting example, a ratio between the size of the sensor coil 204 and the NFC device 110 can be large, such as, for example, 20:1. This large coil size ratio can reduce the coupling information between the sensor coil 204 and the NFC device 110. In some cases, the PTU generated harmonics may be significantly larger than the sensed harmonics from a weakly coupled NFC device 110.

Figure 3:
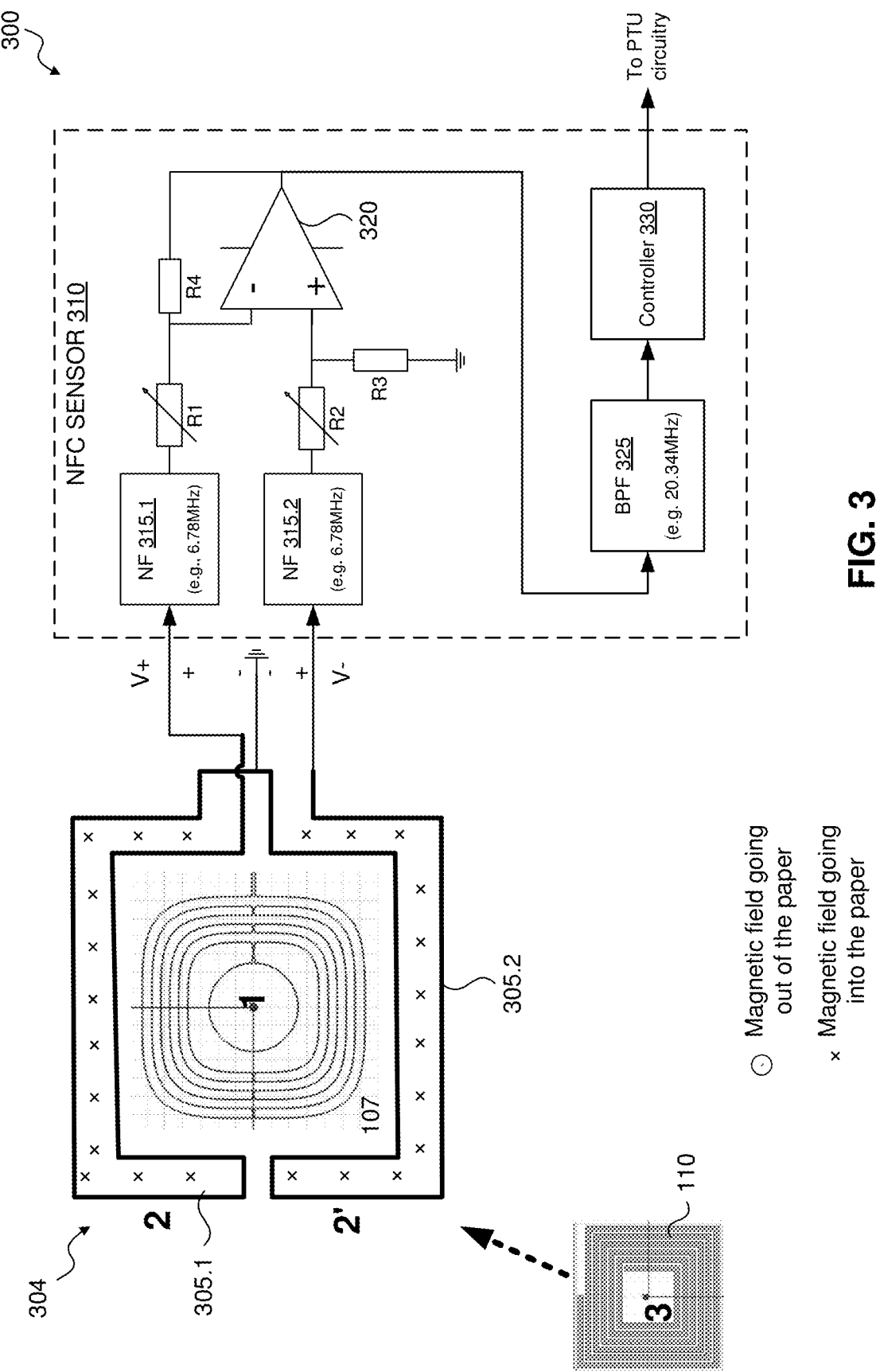
FIG. 3 illustrates a sensor system according to an exemplary aspect of the present disclosure.

FIG. 3 illustrates a sensor system 300 according to an exemplary aspect of the present disclosure. In an exemplary aspect, the sensor system 300 can be independent of or included within a PTU, such as PTU 105.

In an exemplary aspect, the sensor system 300 can include a sensor coil 304 having a first coil portion 305.1 and a second coil portion 305.2, and a sensor 310. The sensor coil 304 is not limited to two coil portions 305 and can include one or more pairs of coil portions 305. For example, the sensor coil 304 can include two coil portions, four coil portions, six coil portions, eight coil portions, or another N pairs of coils as would be understood by one of ordinary skill in the art. In another aspect, the sensor coil 304 is not limited to having multiple pairs of coil portions and can include an odd number of coil portions. The coil portions can also be referred to as coil segments, sub-coils, and sub-loops.

In an exemplary aspect, the first and the second coil portions 305.1, 305.2 are disposed around the PTU coil 107 (also labeled as element 1) of the PTU 105. The first and the second coil portions 305.1, 305.2 can be symmetrically disposed around the PTU coil 107. The first and the second coil portions 305.1, 305.2 can be disposed within the same horizontal plane as the PTU coil 107. That is, the first and the second coil portions 305.1, 305.2 and the PTU coil 107 are disposed on a same plane, where the first and the second coil portions 305.1, 305.2 wrap around the PTU coil 107. As illustrated in FIG. 3, the first and the second coil portions 305.1, 305.2 are C-shaped, but are not limited thereto. The first coil portion 305.1 can be disposed around a first half of the PTU coil 107 while the second coil portion 305.2 is disposed around the remaining half of the PTU coil 107. One or more of the coil portions 305 can be formed by a conductor that is disposed around a portion of the PTU coil 107 and then back along itself to form a C-shaped loop.

In this arrangement, the magnetic coupling coefficient ($K_{12}$) between the PTU coil 107 (element 1) and the first coil portion 305.1 (element 2) is the same as the coupling coefficient ($K_{12}'$) for the second coil portion 305.2 (element 2'). In this example, $K_{12}=K_{12}'$.

In an exemplary aspect, the coil portions 305 are configured to detect a harmonic coupling induced in the coil portions 305. The harmonic coupling can be generated by the proximate NFC device 110. For example, as illustrated in FIG. 3, the NFC device 110 (element 3) is proximate to the second coil portion 305.2 (element 2') and closer to the second coil portion 305.2 than the first coil portion 305.1 (element 2). In this example, the magnetic coupling coefficient ($K_{32}$) between the NFC device 110 (e.g., NFC tag) (element 3) and the first coil portion 305.1 (element 2) is different from the coupling coefficient ($K_{32}'$) for the second coil portion 305.2 (element 2'). That is, $K_{32} \neq K_{32}'$ because of the different distances between the NFC device 110 and the first and the second coil portions 305.1, 305.2.

In an exemplary aspect, the sensor 310 is configured to detect the presence of an NFC device, such as NFC device 110. In this example, the sensor 310 can be referred to as NFC sensor 310. For example, the sensor 310 can be configured to detect when a NFC tag 110 is proximate to the sensor coil 304, including proximate to the coil portion 305.1 and/or the coil portion 305.2. In an exemplary aspect, the sensor 310 is configured to detect the presence of the NFC device 110 based on the magnetic coupling coefficients between the NFC device 110 and the first and second coil portions 305.1, 305.2. For example, the sensor 310 can be configured to detect the NFC device 100 based on the magnetic coupling coefficient ($K_{32}$) between the NFC device 110 (e.g., NFC tag) (element 3) and the first coil portion 305.1 (element 2) and the magnetic coupling coefficient ($K_{32}'$) between the NFC device 110 and the second coil portion 305.2 (element 2'). In an exemplary aspect, the sensor 310 can be configured to detect the NFC device 100 based on a difference between the magnetic coupling coefficients $K_{32}$ and $K_{32}'$. In this example shown in FIG. 3, because the location of the NFC device 110 causes its distance to the first and the second coil portions 305.1 and 305.2 to be different, the magnetic coupling coefficients $K_{32}$ and $K_{32}'$ are different. Based on this difference, the sensor 310 can detect the presence of the NFC device 110.

In an exemplary aspect, the first and the second coil portions 305.1 and 305.2 are configured to generate respective signals based on magnetic coupling induced in the first and the second coil portions 305.1 and 305.2. In an exemplary aspect, the magnetic coupling induced in the first and the second coil portions 305.1 and 305.2 includes the respective magnetic coupling induced by the NFC device 110 in the first and the second coil portions 305.1 and 305.2 (e.g., magnetic coupling coefficients $K_{32}$ and $K_{32}'$) and/or the respective magnetic coupling induced by the PTU coil 105 in the first and the second coil portions 305.1 and 305.2 (e.g., magnetic coupling coefficients $K_{12}$ and $K_{12}'$). The magnetic coupling induced by the PTU 105 in the first and the second coil portions 305.1 and 305.2 (e.g., magnetic coupling coefficients $K_{12}$ and $K_{12}'$) can also be referred to as magnetic distortion. That is, the first coil portion 305.1 can experience magnetic coupling induced by the NFC device 110 (e.g., magnetic coupling coefficients $K_{32}$) and the magnetic coupling induced by the PTU 105 (e.g., magnetic coupling coefficients $K_{12}$). Similarly, the second coil portion 305.2 can experience magnetic coupling induced by the NFC device 110 (e.g., magnetic coupling coefficients $K_{32}'$) and the magnetic coupling induced by the PTU 105 (e.g., magnetic coupling coefficients $K_{12}'$).

In an exemplary aspect, the magnetic coupling MC induced in the sensor coil 304 satisfies the following equation:

$$MC = (K_{12} + K_{32}) + (K_{12}' + K_{32}')$$

Where $K_{12}$ is the magnetic coupling coefficient between the PTU coil 107 and the first coil portion 305.1, $K_{32}$ is the magnetic coupling coefficient between the NFC device 110 and the first coil portion 305.1, $K_{12}'$ is the magnetic coupling coefficient between the PTU coil 107 and the second coil portion 305.2, $K_{32}'$ is the magnetic coupling coefficient between the NFC device 110 and the second coil portion 305.2.

In an exemplary aspect, as described above, the magnetic coupling coefficient ($K_{12}$) between the PTU coil 107 and the first coil portion 305.1 is the same as the coupling coefficient ($K_{12}'$) for the second coil portion 305.2. This relationship is due to the symmetric arrangement of the first and the second coil portions 305.1 and 305.2 around the PTU coil 107. In an exemplary aspect, the sensor 110 can be configured to compensate for differences between the first and the second coil portions 305.1 and 305.2.

However, based on the position of the NFC device 110 with respect to the first and the second coil portions 305.1 and 305.2, the magnetic coupling coefficients $K_{32}$ and $K_{32}'$ may be different. For example, as illustrated in FIG. 3, the NFC device 100 is closer to the second coil portion 305.2. Based on the different distances between the NFC device 110 and the first and the second coil portions 305.1 and 305.2, the magnetic coupling coefficients $K_{32}$ and $K_{32}'$ will be different.

In an exemplary aspect, the sensor 310 includes a differentiator 320 coupled to the sensor coil 304. The differentiator 320 can be coupled to the sensor coil 304 via one or more filters 315.

In an exemplary aspect, the differentiator 320 includes processor circuitry configured to calculate a difference of the respective signals generated by the first and the second coil portions 305.1 and 305.2 and to generate an output signal (e.g., a differentiated signal) based on the calculated difference. The signals can correspond to the magnetic coupling induced in the first and the second coil portions 305.1 and 305.2, respectively. As described above, the magnetic coupling induced in the coil portions 305 can include magnetic coupling induced by the PTU coil 107 and/or the NFC device 110.

In an exemplary aspect, the component of the magnetic coupling induced by the PTU 107 will be the same in the first signal generated by the first coil portion 305.1 as in the second signal generated by the second coil portion 305.2. In this example, the differentiator 320 is configured to cancel out the component of the magnetic coupling induced by the PTU 107 from the signals of the sensor coil 304 by taking the difference of the first and second signals. In an exemplary aspect, the output signal of the differentiator 320 corresponds to the difference in the magnetic coupling induced by the NFC device 100 in the first and the second coil portions 305.1, 305.2. For example, if the output signal indicates a difference between the magnetic coupling induced by the NFC device 100 in the first and the second coil portions 305.1, 305.2, the sensor 310 can detect the NFC device 110 (e.g., that the NFC device is proximate to the PTU coil 107).

In an exemplary aspect, the differentiator 320 is an operational amplifier having an inverted and non-inverted inputs. The inverted input can be connected/coupled to the first coil portion 305.1 and the non-inverted input can be connected/coupled to the second coil portion 305.2. In an exemplary aspect, the inverted input and the non-inverted inputs are connected to the first and the second coil portions 305 via filters 315.1 and 315.2, respectively.

In an exemplary aspect, one or more of the filters 315 is a notch filter (e.g., a band-stop filter or band-rejection filter) configured to filter or attenuate a frequency or frequency band while passing other frequencies. In an exemplary aspect, the notch filter 315 is configured to filter a frequency of, for example, 6.78 MHz, and/or a frequency band having a center frequency at or near 6.78 MHz. The filters 315 are not limited to these example frequencies/bands and can be configured to filter other frequencies as would be understood by one of ordinary skill in the art. Further, the filters 315 are not limited to notch filters and can be configured as other types of filters as would be understood by those of ordinary skill in the relevant arts. In an exemplary aspect, the filters 315 are configured to suppress harmonics, including suppressing harmonics to a level similar to a noise floor. In an exemplary aspect, the filters 315 include processor circuitry configured to perform one or more filtering operations described herein.

In an exemplary aspect, the sensor 310 includes one or more resistors connected to the differentiator 320. The resistors can be configured to tune the sensor 310 to, for example, account for differences/imbalances of the coil portions 305 (e.g., when the coil portions are not exactly symmetrical), filters 315, the differentiator 320, and/or of one or more other components of the sensor 310.

In an exemplary aspect, as illustrated in FIG. 3, the sensor 310 includes first resistor R1 connected between the inverted input of the differentiator 320 and the first coil portion 305.1 (and NF 315.1 in aspects include the filter). A second resistor R2 can be connected between the non-inverted input of the differentiator 320 and the second coil portion 305.2 (and NF 315.2 in aspects include the filter). A third resistor can be connected to a node formed between the resistor R2 and non-inverted input of the differentiator 320 and ground. A fourth resistor R4 can be connected between the inverted input of the differentiator 320 and the output of the differentiator 320. One or more of the resistors R1-R4 can be variable resistors, such as resistors R1 and R2. The values of the resistors R1-R4 can be set to tune the sensor 310 so that the output signal of the differentiator 320 is zero or substantially zero when the PTU coil 107 is active and there is no NFC device 110 near the sensor coil 304. The values of resistors R1-R4 can be the same or different.

In an exemplary aspect, the sensor 310 includes a controller 330 configured to generate a control signal based on the differentiated signal from the differentiator 320. The controller 330 can be configured to generate the control signal and output the control signal to the PTU 105 to control the PTU 105. The controller 330 can control the PTU 105, such as control the operation of the PTU 105. For example, the controller 330 can control the PTU 105 to terminate wireless charging operations based on the differentiated signal (e.g., based on the presence of the NFC device 110 near the PTU coil 107). The controller 330 can additionally or alternatively be configured to control the sensor system 300 and/or the PTU 105 to take one or more actions, such as generate a notification based on the differentiated signal from the differentiator 320. For example, the controller 330 can control the PTU 105 to generate a notification (e.g., audible and/or visual notification) that indicates that a NFC device 110 is proximate to the PTU 105. In an exemplary aspect, the controller 330 includes processor circuitry configured to perform one or more operations of the controller 330, such as to generate the control signal based on the differentiated signal.

In an exemplary aspect, the sensor 310 include a filter 325 coupled between the differentiator 320 and the input to the controller 330. The filter 325 can be configured to filter the differentiated signal to generate a filtered signal, and to provide the filtered signal to the controller 330. In an exemplary aspect the filter 325 is a band-pass filter (BPF), but is not limited to this type of filter. In an exemplary aspect, the filter 325 is configured to filter a frequency of, for example, 20.34 MHz, and/or a frequency band having a center frequency at or near 20.34 MHz. The filter 325 is not limited to these example frequencies/bands and can be configured to filter other frequencies as would be understood by one of ordinary skill in the art. In an exemplary aspect, the filter 325 is configured to filter one or more harmonics of a filtering frequency of the filter(s) 315. For example, 20.34 MHz is a third harmonic of the frequency (6.78 MHz) of the filter 315. In an exemplary aspect, the filter 325 includes processor circuitry configured to perform one or more filtering operations described herein.

Figure 4:
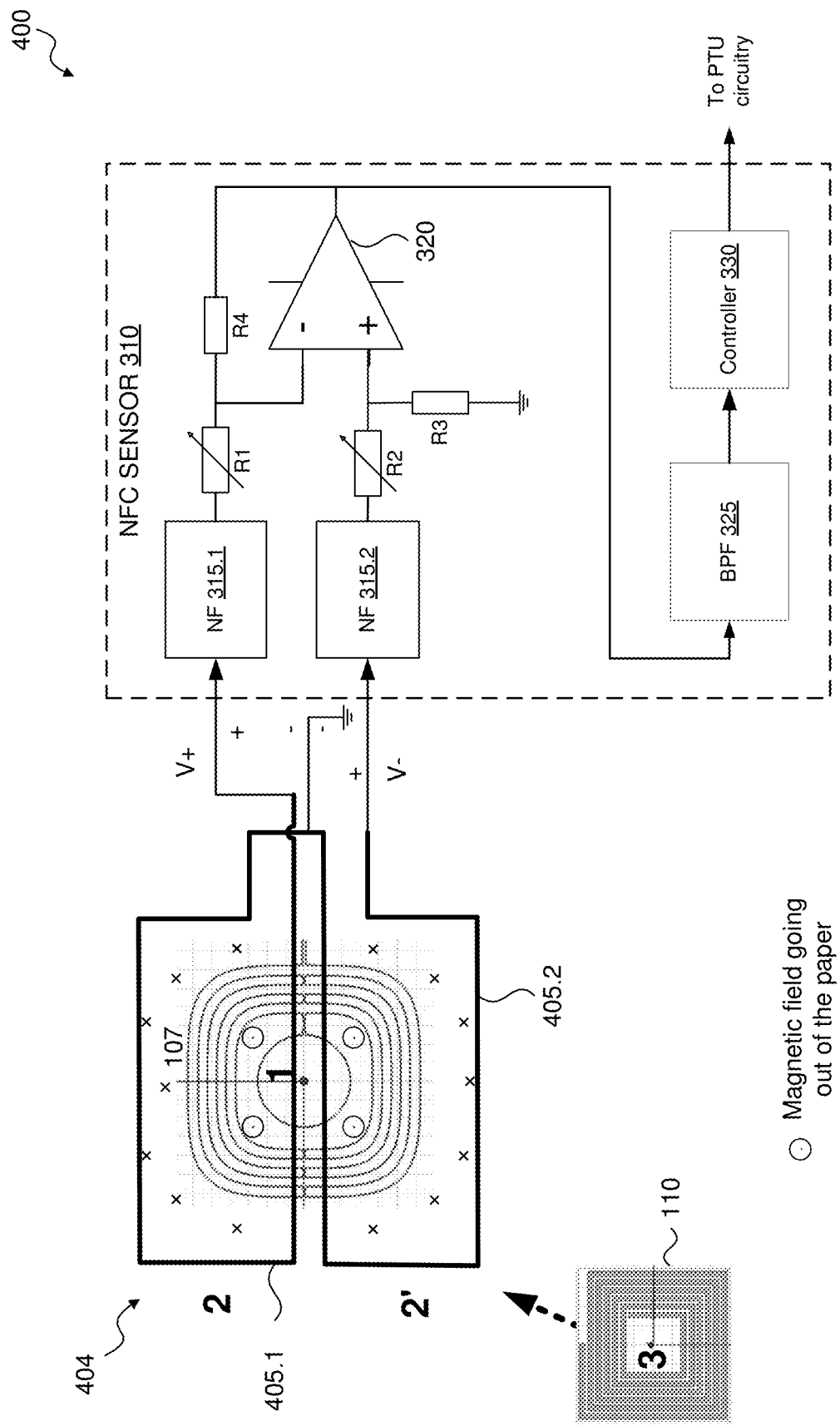
FIG. 4 illustrates a sensor system according to an exemplary aspect of the present disclosure.

FIG. 4 illustrates a sensor system 400 according to an exemplary aspect of the present disclosure. The sensor system 400 is similar to the sensor system 300 and discussion of common or similar elements may have been omitted for brevity. The system 400 can be independent of or included within a PTU, such as PTU 105.

In an exemplary aspect, the sensor system 400 can include a sensor coil 404 having a first coil portion 405.1 and a second coil portion 405.2, and a sensor, such as sensor 310. In this example, the sensor system 400 includes the sensor 310, but includes a different sensor coil.

The sensor coil 404 is not limited to two coil portions 405 and can include one or more pairs of coil portions 405. For example, the sensor coil 404 can include two coil portions, four coil portions, six coil portions, eight coil portions, or another N pairs of coils as would be understood by one of ordinary skill in the art. In another aspect, the sensor coil 404 is not limited to having multiple pairs of coil portions and can include an odd number of coil portions.

In an exemplary aspect, the first and the second coil portions 405.1, 405.2 are disposed on and/or around the PTU coil 107 of the PTU 105. The first and the second coil portions 405.1, 405.2 can be symmetrically disposed on and/or around the PTU coil 107. As illustrated in FIG. 4, the first and the second coil portions 405.1, 405.2 are coil loops, but are not limited thereto. The first coil portion 405.1 can be disposed on and/or around a first half of the PTU coil 107 while the second coil portion 405.2 is disposed on and/or around the remaining half of the PTU coil 107.

In this arrangement, the magnetic coupling coefficient ($K_{12}$) between the PTU coil 107 (element 1) and the first coil portion 405.1 (element 2) is the same as the coupling coefficient ($K_{12}'$) for the second coil portion 405.2 (element 2'). In this example, $K_{12}=K_{12}'$.

In an exemplary aspect, the coil portions 405 are configured to detect a harmonic coupling induced in the coil portions 405. The harmonic coupling can be generated by the proximate NFC device 110. For example, as illustrated in FIG. 4, the NFC device 110 (element 3) is proximate to (and possibly moving towards as indicated by the dashed arrow) the second coil portion 405.2 (element 2') and closer to the second coil portion 405.2 than the first coil portion 405.1 (element 2). In this example, the magnetic coupling coefficient ($K_{32}$) between the NFC device 110 (e.g., NFC tag) (element 3) and the first coil portion 405.1 (element 2) is different from the coupling coefficient ($K_{32}'$) for the second coil portion 405.2 (element 2'). That is, $K_{32} \neq K_{32}'$ because of the different distances between the NFC device 110 and the first and the second coil portions 405.1, 405.2.

In an exemplary aspect, the first and the second coil portions 405.1 and 405.2 are configured to generate respective signals based on magnetic coupling induced in the first and the second coil portions 405.1 and 405.2. In an exemplary aspect, the magnetic coupling induced in the first and the second coil portions 405.1 and 405.2 includes the respective magnetic coupling induced by the NFC device 110 in the first and the second coil portions 405.1 and 405.2 (e.g., magnetic coupling coefficients $K_{32}$ and $K_{32}'$) and/or the respective magnetic coupling induced by the PTU 105 in the first and the second coil portions 405.1 and 405.2 (e.g., magnetic coupling coefficients $K_{12}$ and $K_{12}'$). The signals generated by the coil portions 405 can be provided to sensor 310 similar to the operation of the exemplary aspects described above with respect to FIG. 3.

Figure 5:
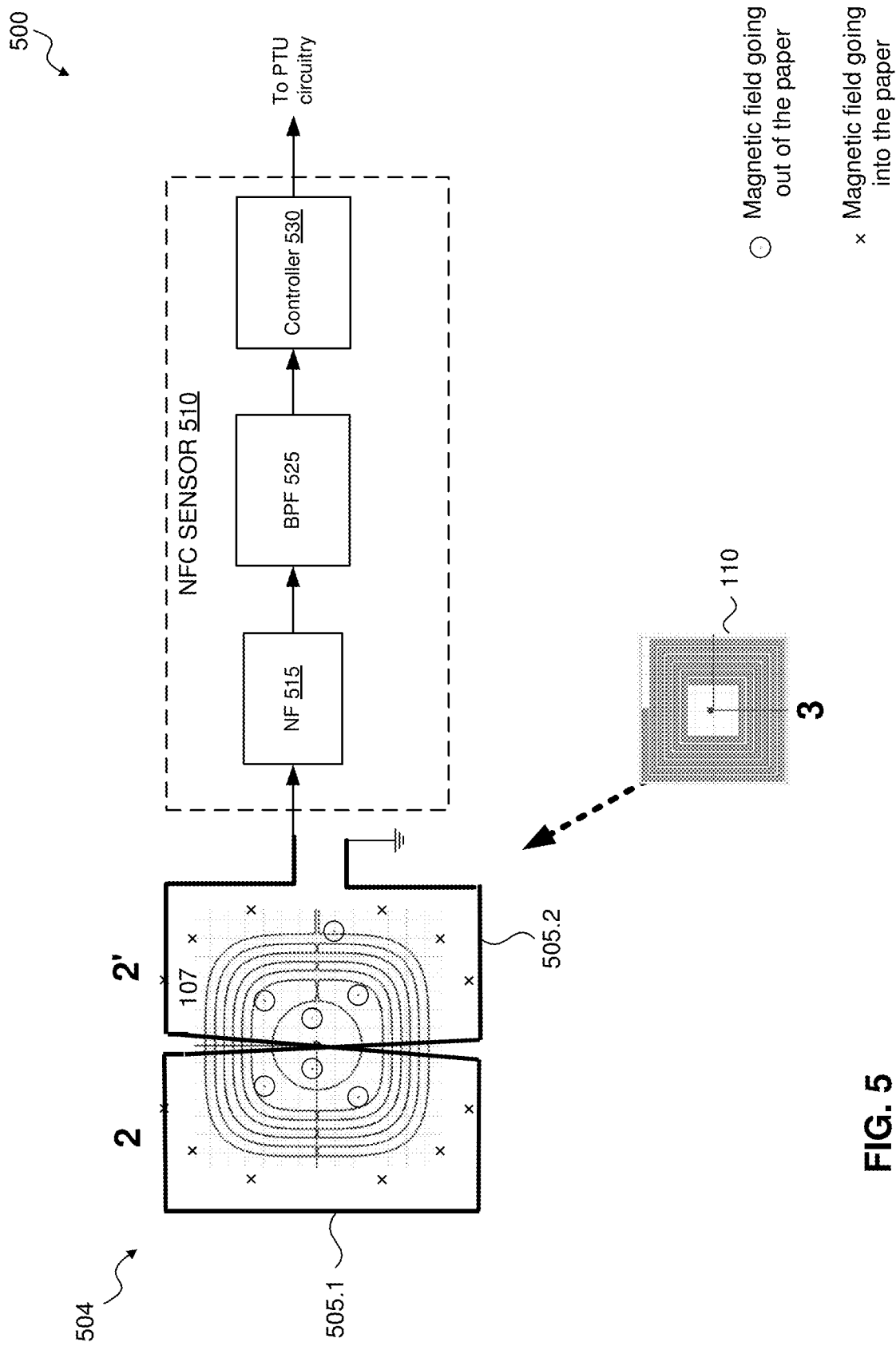
FIG. 5 illustrates a sensor system according to an exemplary aspect of the present disclosure.

FIG. 5 illustrates a sensor system 500 according to an exemplary aspect of the present disclosure. The sensor system 500 is similar to the sensor system 300 and discussion of common or similar elements may have been omitted for brevity. The system 500 can be independent of or included within a PTU, such as PTU 105.

In an exemplary aspect, the sensor system 500 can include a sensor coil 504 having a first coil portion 505.1 and a second coil portion 505.2, and a sensor, such as sensor 510.

The sensor coil 504 is not limited to two coil portions 505 and can include one or more pairs of coil portions 505. For example, the sensor coil 504 can include two coil portions, four coil portions, six coil portions, eight coil portions, or another N pairs of coils as would be understood by one of ordinary skill in the art. In another aspect, the sensor coil 504 is not limited to having multiple pairs of coil portions and can include an odd number of coil portions.

In an exemplary aspect, the first and the second coil portions 505.1, 505.2 are disposed on and/or around the PTU coil 107 of the PTU 105. The first and the second coil portions 505.1, 505.2 can be symmetrically disposed on and/or around the PTU coil 107. As illustrated in FIG. 5, the first and the second coil portions 505.1, 505.2 are coil loops, but are not limited thereto. The first coil portion 505.1 can be disposed on and/or around a first half of the PTU coil 107 while the second coil portion 505.2 is disposed on and/or around the remaining half of the PTU coil 107.

In an exemplary aspect, the sensor coil 504 is formed from a conductor that extends around a first quarter of the PTU coil 107 and across a center area of the PTU coil 107 to an opposing side of the PTU coil 107 and around the a half of the PTU coil 107 to return to the same side of the PTU coil 107 as the first quarter. At this point the conductor again crosses over the center area of the PTU coil 107 (and the other crossing segment of the conductor crossing the center area) and is disposed around the last quarter portion of the PTU coil 107 to return to the originating area of the conductor. That is, the conductor forms a figure-eight formation, where a first looping portion of the figure-eight formation is disposed over and around a first half of the PTU coil 107 (left side of the coil 107 relative to the drawing) and a second looping portion of the figure-eight formation is disposed over and around a second half of the PTU coil 107 (right side of the coil 107 relative to the drawing). In this example, one end of the conductor is connected to the sensor 510 while the other end is coupled to ground.

In this arrangement, the magnetic coupling coefficient ($K_{12}$) between the PTU coil 107 (element 1) and the first coil portion 505.1 (element 2) will be the opposite of the coupling coefficient ($K_{12}'$) for the second coil portion 505.2 (element 2'). In this example, $K_{12}=-K_{12}'$. That is, the component of the magnetic coupling induced by the PTU 107 in the first coil portion 505.1 will be the opposite of the magnetic coupling induced by the PTU 107 in the second coil portion 505.2 based on the configuration (e.g., figure-eight arrangement) of the sensor coil 504. In this example, the output of the sensor coil 504 will not include the component of the magnetic coupling induced by the PTU coil 107 as the component induced in first coil portion 505.1 will cancel out the component induced in the second coil portion 505.2. In operation, in the absence of the NFC device 110, the output of the sensor coil 504 will be zero or substantially zero.

In an exemplary aspect, the coil portions 505 are configured to detect a harmonic coupling induced in the coil portions 505. The harmonic coupling can be generated by the proximate NFC device 110. For example, as illustrated in FIG. 5, the NFC device 110 (element 3) is proximate to (and possibly moving towards as indicated by the dashed arrow) the second coil portion 505.2 (element 2') and closer to the second coil portion 505.2 than the first coil portion 505.1 (element 2). In this arrangement, the magnetic coupling within the first and second coils 505 will also have an inverse relationship similar to the coupling induced by the PTU coil 107.

In the example illustrated in FIG. 5, the magnitude of the magnetic coupling coefficient ($K_{32}$) between the NFC device 110 (e.g., NFC tag) (element 3) and the first coil portion 505.1 (element 2) is different from the magnitude of the coupling coefficient ($K_{32}'$) for the second coil portion 505.2 (element 2'). That is, $|K_{32}| \neq |K_{32}'|$ because of the different distances between the NFC device 110 and the first and the second coil portions 505.1, 505.2.

In an exemplary aspect, the first and the second coil portions 505.1 and 505.2 are configured to collectively generate a signal based on magnetic coupling induced in the first and the second coil portions 505.1 and 505.2. That is, the sensor coil 504 generates a signal and provides it to the sensor 510. In an exemplary aspect, the magnetic coupling induced in the first and the second coil portions 505.1 and 505.2 includes the respective magnetic coupling induced by the NFC device 110 in the first and the second coil portions 505.1 and 505.2 (e.g., magnetic coupling coefficients $K_{32}$ and $K_{32}'$) and/or the respective magnetic coupling induced by the PTU 105 in the first and the second coil portions 505.1 and 505.2 (e.g., magnetic coupling coefficients $K_{12}$ and $K_{12}'$). In this example, because the magnetic coupling coefficients corresponding to the PTU 105 (e.g., magnetic coupling coefficients $K_{12}$ and $K_{12}'$) will cancel or substantially cancel each other out, the resulting signal will reflect the difference between magnetic coupling induced by the NFC device 110 in the first and the second coil portions 505.1 and 505.2 (e.g., magnetic coupling coefficients $K_{32}$ and $K_{32}'$). For example, because the NFC device 110 is closer to the second coil portion 505.2, the magnitudes of the magnetic couplings of the first and the second coil portions 505.1, 505.2 induced by the NFC device 110 will not be equal (e.g., $|K_{32}| \neq |K_{32}'|$). Based on this difference, the sensor 510 (e.g., controller 530) can be configured to determine the presence of the NFC device 110.

In an exemplary aspect, the sensor 510 is configured to detect the presence of an NFC device, such as NFC device 110 based on the magnetic couplings of the first and the second coil portions 505.1, 505.2 induced by the NFC device 110. For example, in the absence of the NFC device, the signal output by the sensor coil 504 will be zero or substantially zero. In this example, the difference between the magnetic coupling of the first coil portion 505.1 and the magnetic coupling of the second coil portion 505.2 induced by the NFC device 110 will be zero or substantially zero. When the NFC device 110 is present, the difference between the magnitude of the magnetic coupling of the first coil portion 505.1 and the magnitude of the magnetic coupling of the second coil portion 505.2 induced by the NFC device 110 will not be zero or substantially zero. That is, the magnitudes of the magnetic couplings of the first and the second coil portions 505.1, 505.2 induced by the NFC device 110. will not be equal (e.g., $|K_{32}| \neq |K_{32}'|$).

In an exemplary aspect, the sensor 510 includes a first filter 515, a second filter 525, and a controller 530. The first filter 515, the second filter 525, and the controller 530 can coupled in series. For example, the first filter 515 can be coupled to the sensor coil 504 and configured to receive the signal collectively generated by the first and the second coil portions 505 and output by the sensor coil 504. The output of the first filter 515 is coupled to the input of the second filter 525. The output of the second filter 525 is coupled to the input of the control 530. The output of the controller 530 can be coupled to the PTU 105 and/or to other circuitry associated with the PTU 105.

In an exemplary aspect, the filter 515 is a notch filter (e.g., a band-stop filter or band-rejection filter) configured to filter or attenuate a frequency or frequency band while passing other frequencies. In an exemplary aspect, the notch filter 515 is configured to filter a frequency of, for example, 6.78 MHz, and/or a frequency band having a center frequency at or near 6.78 MHz. The filter 515 is not limited to these example frequencies/bands and can be configured to filter other frequencies as would be understood by one of ordinary skill in the art. Further, the filter 515 is not limited to notch filters and can be configured as other types of filters as would be understood by those of ordinary skill in the relevant arts. In an exemplary aspect, the filter 515 is configured to suppress harmonics, including suppressing harmonics to a level similar to a noise floor. In an exemplary aspect, the filter 515 include processor circuitry configured to perform one or more filtering operations described herein. In an exemplary aspect, the filter 515 is similar to the filter 315.

In an exemplary aspect, the filter 525 is configured to filter the first filtered signal generated by the filter 515 to generate a second filtered signal, and to provide the second filtered signal to the controller 530. In an exemplary aspect, the filter 525 is a band-pass filter (BPF), but is not limited to this type of filter. In an exemplary aspect, the filter 525 is configured to filter a frequency of, for example, 20.34 MHz, and/or a frequency band having a center frequency at or near 20.34 MHz. The filter 525 is not limited to these example frequencies/bands and can be configured to filter other frequencies as would be understood by one of ordinary skill in the art. In an exemplary aspect, the filter 525 is configured to filter one or more harmonics of a filtering frequency of the filter(s) 515. For example, 20.34 MHz is a third harmonic of the frequency (6.78 MHz) of the filter 515. In an exemplary aspect, the filter 525 includes processor circuitry configured to perform one or more filtering operations described herein.

In an exemplary aspect, the controller 530 is configured to generate a control signal based on the second filtered signal from the filter 525. The controller 530 can be configured to generate the control signal and output the control signal to the PTU 105 (or to PTU circuitry of the PTU 105) to control the PTU 105. The controller 530 can control the PTU 105, such as control the operation of the PTU 105. For example, the controller 530 can control the PTU 105 to temporally pause and/or terminate wireless charging operations based on the differentiated signal (e.g., based on the presence of the NFC device 110 near the PTU coil 107). The controller 530 can additionally or alternatively be configured to control the sensor system 500 and/or the PTU 105 to take one or more actions, such as generate a notification based on the differentiated signal from the differentiator 520. For example, the controller 530 can control the PTU 105 to generate a notification (e.g., audible and/or visual notification) that indicates that a NFC device 110 is proximate to the PTU 105. In an exemplary aspect, the controller 530 includes processor circuitry configured to perform one or more operations of the controller 530, such as to generate the control signal based on the differentiated signal.

In an exemplary aspect, the controller 530 can be configured to tune the sensor 510 to, for example, account for differences/imbalances of the coil portions 505 (e.g., when the coil portions are not exactly symmetrical), filter 515, filter 525, and/or of one or more other components of the sensor 510.

Figure 6:
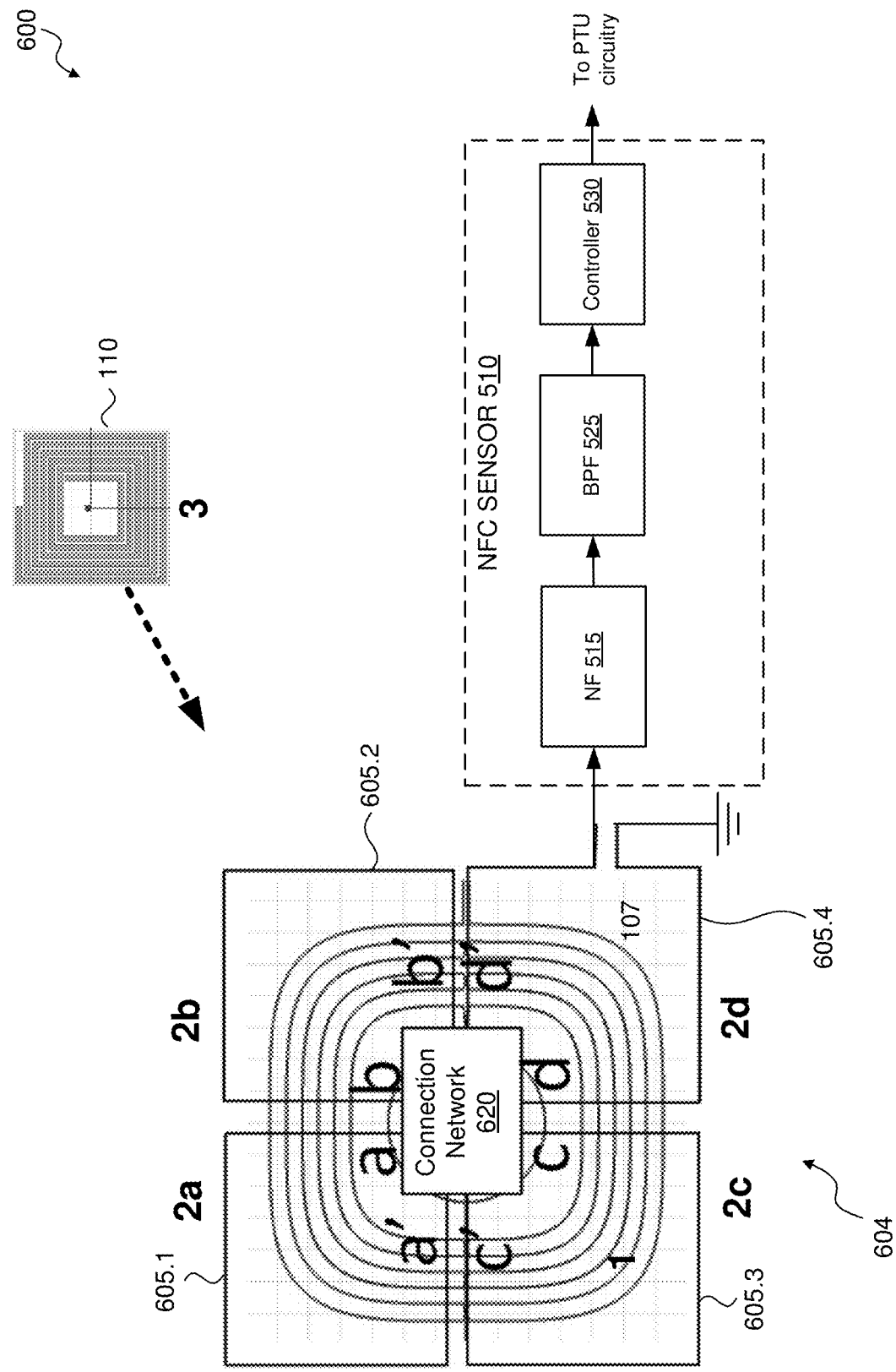
FIG. 6 illustrates a sensor system according to an exemplary aspect of the present disclosure.

FIG. 6 illustrates a sensor system 600 according to an exemplary aspect of the present disclosure. The sensor system 600 is similar to the sensor systems 300, 400, and/or 500 and discussion of common or similar elements may have been omitted for brevity. The system 600 can be independent of or included within a PTU, such as PTU 105.

In an exemplary aspect, the sensor system 600 can include a sensor coil 604 and a sensor, such as sensor 510. In this example, the sensor system 600 includes the sensor 510, but includes a different sensor coil. In an exemplary aspect, the sensor coil 604 includes a first coil portion 605.1, a second coil portion 605.2, a third coil portion 605.3, and a fourth coil portion 605.4. For example, as illustrated in FIG. 6, the four coil portions 605 are arranged in a cloverleaf formation. In an exemplary aspect, the sensor coil also includes a connection network 620 configured to selectively connect/couple (e.g., electrically and/or physically) the coil portions 605 together.

The sensor coil 604 is not limited to four coil portions 605 and can include one or more pairs of coil portions 605. For example, the sensor coil 604 can include two coil portions, four coil portions, six coil portions, eight coil portions, or another N pairs of coils as would be understood by one of ordinary skill in the art. In another aspect, the sensor coil 604 is not limited to having multiple pairs of coil portions and can include an odd number of coil portions.

In an exemplary aspect, the first, the second, the third, and the fourth coil portions 605 are disposed on and around the PTU coil 107 of the PTU 105. The first, the second, the third, and the fourth coil portions 605 can be symmetrically disposed on and around the PTU coil 107. As illustrated in FIG. 6, the first, the second, the third, and the fourth coil portions 605 are coil loops forming a cloverleaf arrangement, but are not limited thereto. In an exemplary aspect, the coil portions 605 are formed from a conductor that forms a looped arrangement. In this example, the beginning and ending of each loop arrangement can be connected to the connection network 620. For example, connection network 620 can be configured to selectively connect the coil portions 605 at the center of the cloverleaf arrangement. With reference to FIG. 6, the beginning and end of the first coil portion 605.1 (element 2a) are identified as "a" and "a'", the beginning and end of the second coil portion 605.2 (element 2b) are identified as "b" and "b'", the beginning and end of the first coil portion 605.3 (element 2c) are identified as "c" and "c'", and beginning and end of the first coil portion 605.4 (element 2d) are identified as "d" and "d'". In operation, the connection network 620 can be configured to selectively connect the ends a, a', b, b', c, c', d, and d' together to form various loop configurations. In an exemplary aspect, the coil portions 605 are connected so that adjacent coil portions aid the detection of the harmonic intensity of the NFC device 110 while reducing the PTU coil 107 harmonic coupling.

In an exemplary aspect, the connection network 620 can connect the ends of the coils portions 605 based on the following equation, where a "1" identifies a connection and a "0" identifies no connection, and where each row in the matrix represents a connection configuration.

$$[ab'\ ac'\ ad'\ ba'\ bc'\ bd'\ ca'\ cb'\ cd'\ da'\ db'\ dc'] =$$

$$\begin{bmatrix} 1 & 0 & 0 & 0 & 1 & 0 & 0 & 0 & 1 & 1 & 0 & 0 \\ 1 & 0 & 0 & 0 & 0 & 1 & 1 & 0 & 0 & 0 & 0 & 1 \\ 0 & 1 & 0 & 0 & 0 & 1 & 0 & 1 & 0 & 1 & 0 & 0 \\ 0 & 1 & 0 & 1 & 0 & 0 & 0 & 1 & 0 & 1 & 0 \\ 0 & 0 & 1 & 0 & 1 & 0 & 1 & 0 & 0 & 0 & 1 & 0 \\ 0 & 0 & 1 & 1 & 0 & 0 & 0 & 1 & 0 & 0 & 0 & 1 \end{bmatrix}$$

Figure 7:
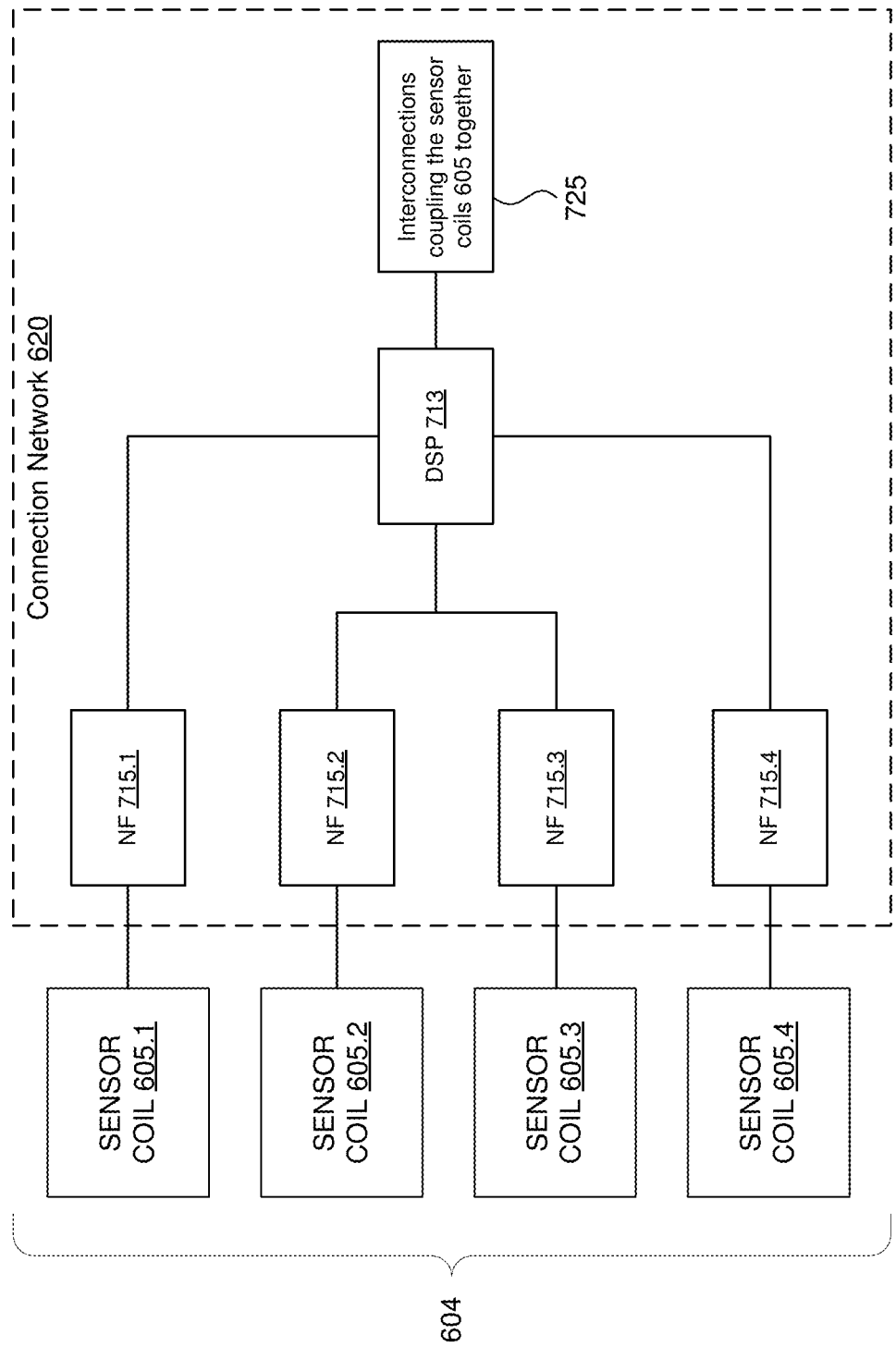
FIG. 7 illustrates a connection network according to an exemplary aspect of the present disclosure.

In an exemplary aspect, with reference to FIG. 7, the connection network 620 can be configured to dynamically select the connection of the coil portions 605. In an exemplary aspect, the connection network 620 can include a digital signal processor (DSP) 713 configured to control the connections 725 of the coil portions to enable/disable the connections. For example, the DSP 713 can be configured to generate one or more control signal to control the connections 725 based on the signals generated by the first coil portion 605.1, the second coil portion 605.2, the third coil portion 605.3, and/or the fourth coil portion 605.4.

In an exemplary aspect, the connection network 620 can include respective filters 715 connected between the coil portions 605 and the DSP 713. The filters 715 can be notch filters similar to notch filters 315, but are not limited thereto. Further, the filters 715 can be configured to filter the same or different frequencies.

In an exemplary aspect, the controller 530 can be configured to generate a control signal and provide the control signal to the connection network 620 to control the connections of the coil portions 605. In this example, the controller 530 can be configured to generate the control signal based on signal collectively generated by the coil portions 605.

In an exemplary operation, the connection network 620 can be configured to dynamically switch the connection of the coil portions 605 to change the number of coil portions. For example, the connection network 620 can be configured to dynamically switch the connections of the coil portions 605 to function as two larger coil portions similar to the coil 504 of FIG. 5 and to function as four smaller coil portions as illustrated in FIG. 6. In this example, the sensor coil 605 can be configured to form smaller coil portions to increase the detection of smaller NFC devices.

Figure 8:
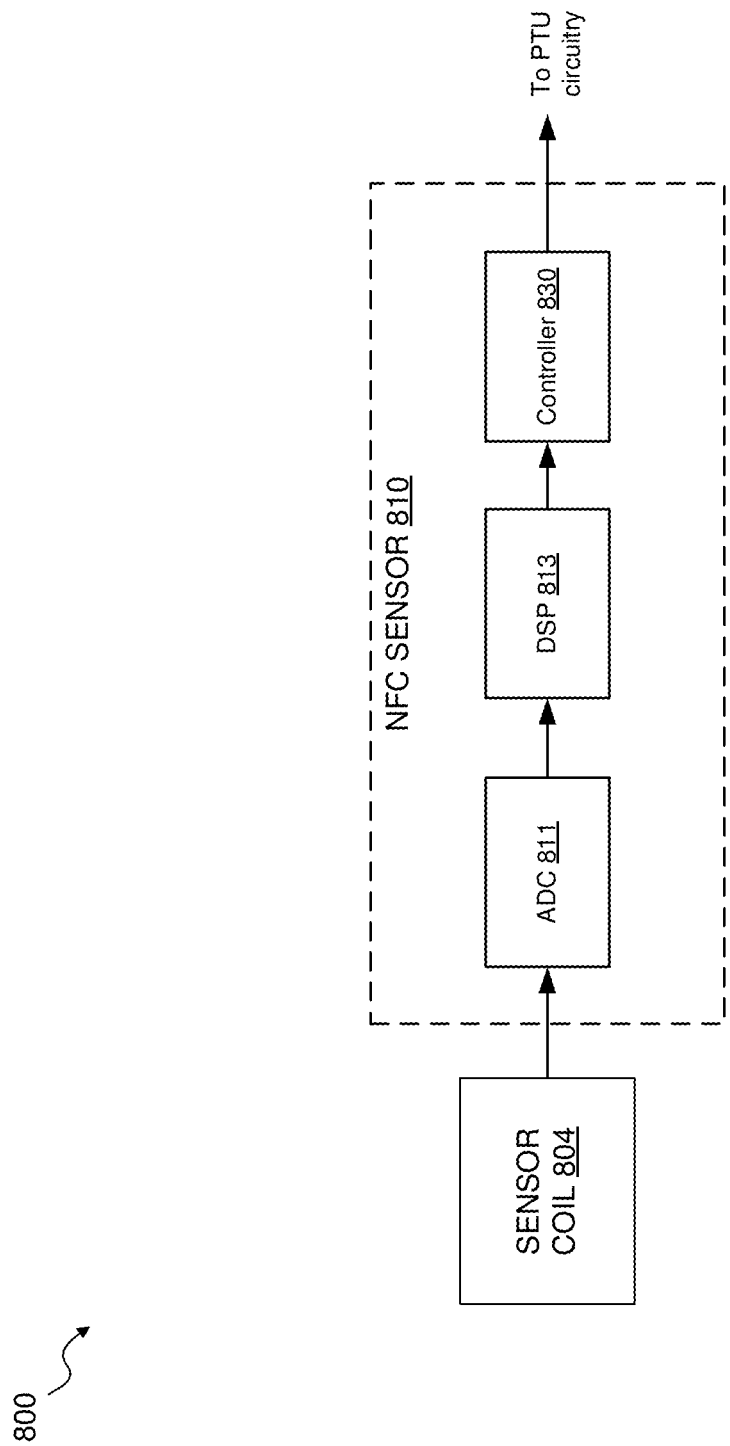
FIG. 8 illustrates a sensor system according to an exemplary aspect of the present disclosure.

FIG. 8 illustrates a sensor system 800 according to an exemplary aspect of the present disclosure. The sensor system 800 is similar to the sensor systems 300, 400, 500 and/or 600, and discussion of common or similar elements may have been omitted for brevity. The system 800 can be independent of or included within a PTU, such as PTU 105.

In an exemplary aspect, the sensor system 800 can include a sensor coil 804 and a sensor 810. The sensor coil 804 can be a sensor coil as illustrated in FIGS. 2-6. The sensor 810 can include an analog-to-digital converter (ADC) 811, a digital-signal processor (DSP) 813 and a controller 830.

In an exemplary aspect, the sensor 810 is configured to detect the presence of an NFC device, such as NFC device 110 based on one or more signals generated by the sensor coil 804.

The ADC 811, DSP 813, and controller 830 can be coupled in series. For example, the DSP 811 can be coupled to the sensor coil 804 and configured to receive the signal(s) from the sensor coil 804. The output of the ADC 811 is coupled to the input of the DSP 813. The output of the DSP 813 is coupled to the input of the controller 830. The output of the controller 830 can be coupled to the PTU 105 and/or to other circuitry associated with the PTU 105.

In an exemplary aspect, the ADC 811 is configured to convert an analog signal received from the sensor coil 804 to a digital signal representing the received analog signal. The ADC 813 can generate the digital signal based on the input analog signal and provide the digital signal to the DSP 813. The ADC 811 can include processor circuitry configured to perform one or more operations of the ADC 811 such as convert an analog signal to a digital signal.

The DSP 813 can be configured to perform one or more digital signal processing operations on the received signal to generate a processed signal. For example, the DSP 813 can be configured to differentiate two received signal from sensor coil 804 similar to the aspects illustrated in FIGS. 3-4. In an exemplary aspect, the DSP 813 is configured to perform one or more filtering operations, and/or one or more other operations as would be understood by one of ordinary skill in the relevant arts. In an exemplary aspect, the DSP 813 can be configured to tune the sensor 810 to, for example, account for differences/imbalances of the coil 804, adjust the ADC 811, and/or of one or more other components of the sensor 810. In an exemplary aspect, the DSP 813 includes processor circuitry configured to perform one or more operations of the DSP 813, such as to perform one or more digital signal processing operations.

In an exemplary aspect, the controller 830 is configured to generate a control signal based on the processed signal from the DSP 813. The controller 830 can be configured to generate the control signal and output the control signal to the PTU 105 (or to PTU circuitry of the PTU 105) to control the PTU 105. The controller 830 can control the PTU 105, such as control the operation of the PTU 105. For example, the controller 830 can control the PTU 105 to terminate wireless charging operations based on the differentiated signal (e.g., based on the presence of the NFC device 110 near the PTU coil 107). The controller 830 can additionally or alternatively be configured to control the sensor system 800 and/or the PTU 105 to take one or more actions, such as generate a notification based on the processing signal from the DSP 813. For example, the controller 830 can control the PTU 105 to generate a notification (e.g., audible and/or visual notification) that indicates that a NFC device 110 is proximate to the PTU 105. In an exemplary aspect, the controller 830 includes processor circuitry configured to perform one or more operations of the controller 830, such as to generate the control signal based on the differentiated signal.

In an exemplary aspect, the controller 830 can be configured to tune the sensor 810 to, for example, account for differences/imbalances of the coil 804, adjust the ADC 811, and/or of one or more other components of the sensor 810.

It should be appreciated that any combination of the coil structures and sensors described herein can be utilized together. That is, it is submitted that it is within the knowledge of one of ordinary skill in the art to combine any of the coil structures (304, 404, 505, 604, 804) with any of the sensors (310, 510, 810) based in the teachings described herein.

EXAMPLES

Example 1 is a sensor system, comprising: a sensor coil comprising first and second coil portions, the first and the second coil portions being configured to generate respective first and second signals based on magnetic coupling induced in the first and the second coil portions by a receiving coil device; and a sensor coupled to the sensor coil and configured to: reduce magnetic distortion induced in the first and the second coil portions by a power transmitting unit (PTU) based on the generated first and second signals; detect the receiving coil device based the first and the second signals; and control the PTU based on the detected receiving coil device.

In Example 2, the subject matter of Example 1, wherein the first and the second signals are generated based on the magnetic coupling induced in the first and the second coil portions by the receiving coil device and the magnetic distortion induced in the first and the second coil portions by the magnetic coupling of the PTU.

In Example 3, the subject matter of Example 1, wherein the sensor is configured to calculate a difference between the first and second signals to reduce the magnetic distortion induced in the first and the second coil portions by the PTU and to detect the receiving coil device.

In Example 4, the subject matter of Example 1, wherein the sensor further comprises first and second notch filters coupled to the first and the second coil portions, respectively, and configured to filter a frequency band out of the first and the second signals to reduce the magnetic distortion induced in the sensor coil by the magnetic coupling of the PTU.

In Example 5, the subject matter of Example 4, wherein the first and the second notch filters are configured to filter a frequency of 6.78 MHz out of the first and the second signals.

In Example 6, the subject matter of Example 4, wherein the sensor further comprises a differentiator that is configured to calculate a difference between the first and second signals to reduce the magnetic distortion induced in the first and the second coil portions by the PTU and to detect the receiving coil device.

In Example 7, the subject matter of Example 6, wherein the sensor further comprises a band pass filter configured to receive a differentiated signal from the differentiator and to filter the differentiated signal to generate a filtered signal.

In Example 8, the subject matter of Example 7, wherein the band pass filter is configured to filter a harmonic frequency of a frequency filtered by one more of the first and the second notch filters.

In Example 9, the subject matter of Example 1, wherein the first and the second coil portions are symmetrically positioned with respect to a transmission coil of the PTU.

In Example 10, the subject matter of Example 1, wherein the first coil portion forms a first coil loop around a first portion of a transmission coil of the PTU and the second coil portion forms a second coil loop around a second portion of the transmission coil of the PTU.

In Example 11, the subject matter of Example 10, wherein the first coil loop and the second coil loop are disposed on the first and the second portions of the transmission coil of the PTU.

In Example 12, the subject matter of Example 11, wherein the first and the second coil loops are symmetrically disposed on the transmission coil of the PTU.

In Example 13, the subject matter of Example 1, wherein: the sensor coil further comprises third and fourth coil portions, the third and the fourth coil portions being configured to generate respective third and fourth signals based on magnetic coupling induced in the third and the fourth coil portions by the receiving coil device and magnetic distortion induced in the third and the fourth coil portions by magnetic coupling of the PTU; and the sensor is further configured to: reduce the magnetic distortion induced in the third and the fourth coil portions by the PTU; and detect the receiving coil device based the third and the fourth signals.

In Example 14, the subject matter of Example 13, wherein the sensor coil further comprises a connection network configured to selectively couple the first, the second, the third, and the fourth coil portions together.

In Example 15, the subject matter of Example 14, wherein the sensor is further configured to control the connection network to selectively couple the first, the second, the third, and the fourth coil portions together based on the first, the second, the third, and the fourth signals.

In Example 16, the subject matter of Example 1, wherein the receiving coil device is a near-field communication (NFC) tag.

Example 17 is a sensor system, comprising: a sensor coil comprising: first, second, third, and fourth coil portions being configured to generate respective first, second, third, and fourth signals based on magnetic coupling induced in the first, the second, the third, and the fourth coil portions by a receiving coil device; and a sensor coupled to the sensor coil and configured to: reduce magnetic distortion induced in the first, the second, the third, and the fourth coil portions by a power transmitting unit (PTU) based on the generated first, second, third, and fourth signals; detect the receiving coil device based the first, the second, the third, and the fourth signals; and control the PTU based on the detected receiving coil device.

In Example 18, the subject matter of Example 17, wherein the sensor coil further comprises a connection network configured to selectively couple the first, the second, the third, and the fourth coil portions together.

In Example 19, the subject matter of Example 18, wherein the sensor is further configured to control the connection network to selectively couple the first, the second, the third, and the fourth coil portions together based on the first, the second, the third, and the fourth signals.

In Example 20, the subject matter of Example 17, wherein the first, the second, the third and the fourth signals are generated based on the magnetic coupling induced in the first, the second, the third, and the fourth coil portions by the receiving coil device and the magnetic distortion induced in the first, the second, the third, and the fourth coil portions by the magnetic coupling of the PTU.

Example 21 is a sensor system, comprising: a sensor coil including first and second coil portions, the first and the second coil portions being configured to cooperatively generate a signal based on magnetic coupling induced in the first and the second coil portions by a receiving coil device; and a sensor coupled to the sensor coil, the sensor being configured to: reduce magnetic distortion induced in the first and the second coil portions by a power transmitting unit (PTU) based on the generated signal; detect the receiving coil device based the signal; and control the PTU based on the detected receiving coil device.

In Example 22, the subject matter of Example 21, wherein the sensor further comprises a notch filter coupled to the first and the second coil portions and configured to filter a frequency band out of the signal to generate a notch filtered signal.

In Example 23, the subject matter of Example 22, wherein the sensor further comprises a band pass filter configured to receive the notch filtered signal from the notch filter and to band-pass filter the notch filter signal to generate a band-pass filter signal, the sensor being configured to control the PTU based on the band-pass filter signal.

In Example 24, the subject matter of Example 23, wherein the band pass filter is configured to band-pass filter a harmonic frequency of the frequency band filtered by the notch filter.

In Example 25, the subject matter of Example 21, wherein the signal is generated based on the magnetic coupling induced in the first and the second coil portions by the receiving coil device and the magnetic distortion induced in the first and the second coil portions by the magnetic coupling of the PTU.

Example 26 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Exemplary aspects are not limited to NFC communications and can be applied to other cellular or non-cellular communication protocols (e.g., Radio Frequency Identification Devices (RFID), Bluetooth, etc.) as would be understood by one of ordinary skill in the relevant arts.

What is claimed is:

1. A sensor system, comprising:
a sensor coil comprising first and second coil portions, the first and the second coil portions being configured to generate respective first and second signals based on (i) a magnetic coupling between the first and the second coil portions and a transmission coil of a power transmitting unit (PTU), and (ii) a magnetic coupling between the first and the second coil portions and an external receiving coil; and
a sensor coupled to the sensor coil and configured to:
process the generated first and second signals to reduce magnetic distortion caused by the magnetic coupling between the first and the second coil portions and the transmission coil to thereby detect the external receiving coil; and
control one or more operations of the PTU in response to the detection of the external receiving coil,
wherein the transmission coil is to be inductively coupled to a power receiving unit (PRU) coil of a PRU to cause the PRU to perform wireless charging operations.

2. The sensor system of claim 1, wherein the sensor is configured to calculate a difference between the first and second signals to reduce the magnetic distortion caused by the magnetic coupling between the first and the second coil portions and the transmission coil of the PTU to thereby detect the external receiving coil.

3. The sensor system of claim 1, wherein the sensor further comprises first and second notch filters coupled to the first and the second coil portions, respectively, and configured to filter a frequency band out of the first and the second signals to reduce the magnetic distortion caused by the magnetic coupling between the first and the second coil portions and the transmission coil of the PTU.

4. The sensor system of claim 3, wherein the first and the second notch filters are configured to filter a frequency band of 6.78 MHz out of the first and the second signals.

5. The sensor system of claim 3, wherein the sensor further comprises a differentiator that is configured to calculate a difference between the first and second signals to reduce the magnetic distortion caused by the magnetic coupling between the first and the second coil portions and the transmission coil of the PTU to detect the external receiving coil.

6. The sensor system of claim 5, wherein the sensor further comprises a band pass filter configured to receive a differentiated signal from the differentiator and to filter the differentiated signal to generate a filtered signal.

7. The sensor system of claim 6, wherein the band pass filter is configured to filter a harmonic frequency of a frequency filtered by one more of the first and the second notch filters.

8. The sensor system of claim 1, wherein the first and the second coil portions are symmetrically positioned with respect to the transmission coil of the PTU.

9. The sensor system of claim 1, wherein the first coil portion forms a first coil loop around a first portion of the transmission coil of the PTU, and wherein the second coil portion forms a second coil loop around a second portion of the transmission coil of the PTU.

10. The sensor system of claim 9, wherein the first coil loop and the second coil loop are disposed on the first and the second portions of the transmission coil of the PTU.

11. The sensor system of claim 10, wherein the first and the second coil loops are symmetrically disposed on the transmission coil of the PTU.

12. The sensor system of claim 1, wherein:
the sensor coil further comprises third and fourth coil portions, the third and the fourth coil portions being configured to generate respective third and fourth signals based on (i) magnetic coupling between the third and the fourth coil portions and the external receiving coil, and cii) magnetic coupling between the third and the fourth coil portions and the transmission coil of the PTU; and
the sensor is further configured to:
process the generated third and fourth signals to reduce magnetic distortion caused by the magnetic coupling between the third and the fourth coil portions and the transmission coil of the PTU to thereby
detect the external receiving coil based the first, second, third, and fourth signals.

13. The sensor system of claim 12, wherein the sensor coil further comprises a connection network configured to selectively couple the first, the second, the third, and the fourth coil portions together.

14. The sensor system of claim 13, wherein the sensor is further configured to control the connection network to selectively couple the first, the second, the third, and the fourth coil portions together based on the first, the second, the third, and the fourth signals.

15. The sensor system of claim 1, wherein the external receiving coil is a near-field communication (NFC) tag.

16. A sensor system, comprising:
a sensor coil comprising:
first, second, third, and fourth coil portions configured to generate respective first, second, third, and fourth signals based on (i) magnetic coupling between the first, the second, the third, and the fourth coil portions and a transmission coil of a power transmitting unit (PTU), and (ii) magnetic coupling between the first, the second, the third, and the fourth coil portions and an external receiving coil; and
a sensor coupled to the sensor coil and configured to:
process the generated first, second, third, and fourth signals to reduce magnetic distortion caused by the magnetic coupling between the first, the second, the third, and the fourth coil portions and the transmission coil to thereby detect the external receiving coil; and
control one or more operations of the PTU in response to the detection of the external receiving coil,
wherein the transmission coil is to be inductively coupled to a power receiving unit (PRU) coil of a PRU to cause the PRU to perform wireless charging operations.

17. The sensor system of claim 16, wherein the sensor coil further comprises a connection network configured to selectively couple the first, the second, the third, and the fourth coil portions together.

18. The sensor system of claim 17, wherein the sensor is further configured to control the connection network to selectively couple the first, the second, the third, and the fourth coil portions together based on the first, the second, the third, and the fourth signals.

19. A sensor system, comprising:
a sensor coil including first and second coil portions, the first and the second coil portions being configured to cooperatively generate a signal based on (i) magnetic coupling between the first and the second coil portions and a transmission coil of a power transmitting unit (PTU) and (ii) magnetic coupling between the first and the second coil portions and an external receiving coil; and
a sensor coupled to the sensor coil, the sensor being configured to:
process the generated signal to reduce magnetic distortion caused by the magnetic coupling between the first and the second coil portions and the transmission coil to thereby detect the external receiving coil; and
control one or more operations of the PTU in response to the detection of the external receiving coil,
wherein the transmission coil is to be inductively coupled to a power receiving unit (PRU) coil of a PRU to enable the PRU to perform wireless charging operations.

20. The sensor system of claim 19, wherein the sensor further comprises a notch filter coupled to the first and the second coil portions and configured to filter a frequency band out of the signal to generate a notch filtered signal.

21. The sensor system of claim 20, wherein the sensor further comprises a band pass filter configured to receive the notch filtered signal from the notch filter and to band-pass filter the notch filter signal to generate a band-pass filter signal, the sensor being configured to control one or more operations of the PTU based on the band-pass filter signal.

22. The sensor system of claim 21, wherein the band pass filter is configured to band-pass filter a harmonic frequency of the frequency band filtered by the notch filter.

23. The sensor system of claim 15, wherein the first and the second coil loops are symmetrically disposed on the transmission coil of the PTU in two axes.

24. The sensor system of claim 15, wherein the external receiving coil is independent of the PTU and the PRU.

* * * * *